US010762035B1

(12) United States Patent
Kumar et al.

(10) Patent No.: US 10,762,035 B1
(45) Date of Patent: Sep. 1, 2020

(54) MATRIX TILING TO ACCELERATE COMPUTING IN REDUNDANT MATRICES

(71) Applicant: Hewlett Packard Enterprise Development LP, Houston, TX (US)

(72) Inventors: Suhas Kumar, Palo Alto, CA (US); Rui Liu, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 27 days.

(21) Appl. No.: 16/271,638

(22) Filed: Feb. 8, 2019

(51) Int. Cl.
 *G06F 15/00* (2006.01)
 *G06F 15/80* (2006.01)
 *G06F 9/30* (2018.01)

(52) U.S. Cl.
 CPC ........ *G06F 15/8092* (2013.01); *G06F 9/3001* (2013.01)

(58) Field of Classification Search
 None
 See application file for complete search history.

(56) References Cited

U.S. PATENT DOCUMENTS

| 5,812,992 A | 9/1998 | de Vries | |
|---|---|---|---|
| 8,700,552 B2 | 4/2014 | Yu et al. | |
| 10,061,748 B2 * | 8/2018 | Kernert | G06F 17/16 |
| 10,140,251 B2 * | 11/2018 | Zhou | G06F 9/3887 |
| 2016/0217367 A1 | 7/2016 | Moreno et al. | |
| 2018/0349061 A1 * | 12/2018 | Nagano | G06F 9/30 |
| 2019/0042237 A1 * | 2/2019 | Azizi | G06F 9/30036 |

FOREIGN PATENT DOCUMENTS

CN    107239824 A    10/2017

OTHER PUBLICATIONS

Dong Yu et al., "Exploiting Sparseness in Deep Neural Networks for Large Vocabulary Speech Recognition," ICASSP, 2012, pp. 4409-4412, IEEE.
M. Gethsiyal Augasta and T. Kathirvalavakumar, "Pruning Algorithms of Neural Networks—A Comparative Study," 2003, pp. 1-11 (online), Retrieved from the Internet on Aug. 29, 2018 at URL: <degruyter.com/downloadpdf/j/comp.2013.3.issue-3/s13537-013-0109-x/s13537-013-0109-x.pdf>.
Xuhao Chen, "Escort: Efficient Sparse Convolutional Neural Networks on GPUs," Feb. 28, 2018, pp. 1-10, National University of Defense Technology Changsha, Hunan, China.

* cited by examiner

*Primary Examiner* — Corey S Faherty
(74) *Attorney, Agent, or Firm* — Sheppard Mullin Richter & Hampton LLP

(57) ABSTRACT

Systems and methods are provided for matrix tiling to accelerate computing in redundant matrices. The method may include identifying unique submatrices in the matrix; loading values of elements of each unique submatrix into a respective one of the array processors; applying the vector to inputs of each of the array processors; and adding outputs of the array processors according to locations of the unique submatrices in the matrix.

20 Claims, 8 Drawing Sheets

MATRIX TILING TO ACCELERATE COMPUTING IN REDUNDANT MATRICES

DESCRIPTION OF RELATED ART

The disclosed technology relates generally to the solution of computationally-difficult problems, and more particularly some implementations relate to matrix operations for solving such problems.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 illustrates a Hamiltonian matrix for a N-city traveling sales problem.

FIG. 3 illustrates one unique submatrix of FIG. 2.

FIG. 4 illustrates another unique submatrix of FIG. 2.

The figures are not exhaustive and do not limit the present disclosure to the precise form disclosed.

DETAILED DESCRIPTION

Non von Neumann systems such as recurrent neural networks are being intensely researched to solve many computationally difficult problems (e.g., NP-hard problems such as vehicle routing, scheduling, traveling salesman, etc.). These computationally difficult problems cannot be efficiently solved by any of the conventional approaches, which include the use of central processing units (CPU), graphical processing units (GPU), complimentary metal oxide semiconductor (CMOS) logic circuits, and the like.

Many of these computationally-difficult problems involve the solution of sparse matrices, that is, matrices with few non-zero values. The hardware, power, and time required to process sparse matrices is the same as for dense matrices, that is, matrices with many non-zero values, despite the many redundancies present in sparse matrices.

The disclosed technology may identify unique submatrices within a redundant matrix, and then processes only one copy of each unique submatrix. An adder may generate an output using the results from processing each unique submatrix, along with knowledge of the locations of the unique submatrices within the matrix. This solution may require far less hardware, power, and time than prior solutions.

Figure 1:
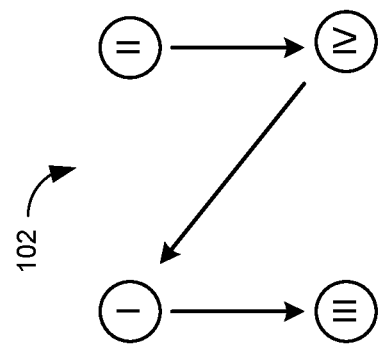
FIG. 1 illustrates a well-studied problem, the traveling sales problem, that may be solved using a sparse Hamiltonian matrix.

In recurrent neural networks, these computationally difficult problems may be represented as Hamiltonian matrices. FIG. 1 illustrates a well-studied problem, the traveling sales problem, that may be solved using a sparse Hamiltonian matrix. Referring to FIG. 1, one solution to a four-city traveling sales problem is illustrated at 102. In the example of FIG. 1, each city is represented by a Roman numeral, with a solution given by a sequence of the cities II, IV, I, III. The solution may be represented as a 4×4 matrix, as shown at 104. In that matrix, each row represents one of the cities, while the columns represent the order in which the cities are visited.

A Hamiltonian matrix representing a four-city traveling sales problem may be determined using the equation below.

$$w_{(i,k),(l,j)} = -C_1 \delta_{i,j}(1-\delta_{k,j}) - C_2 \delta_{k,j}(1-\delta_{i,j}) - C_3 - C_4 D_{i,l}(\delta_{j,k+1} + \delta_{j,k-1}),$$

where the first term represents the order in which the cities are visited, the second term represents the cities, the third term represents the number of cities, and the fourth term represents the total distance for the four-city trip. For the four-city problem, $N=4$, and the resulting Hamiltonian matrix has dimensions of $N^2 \times N^2 = 16 \times 16$, for a total of 256 elements.

Figure 2:
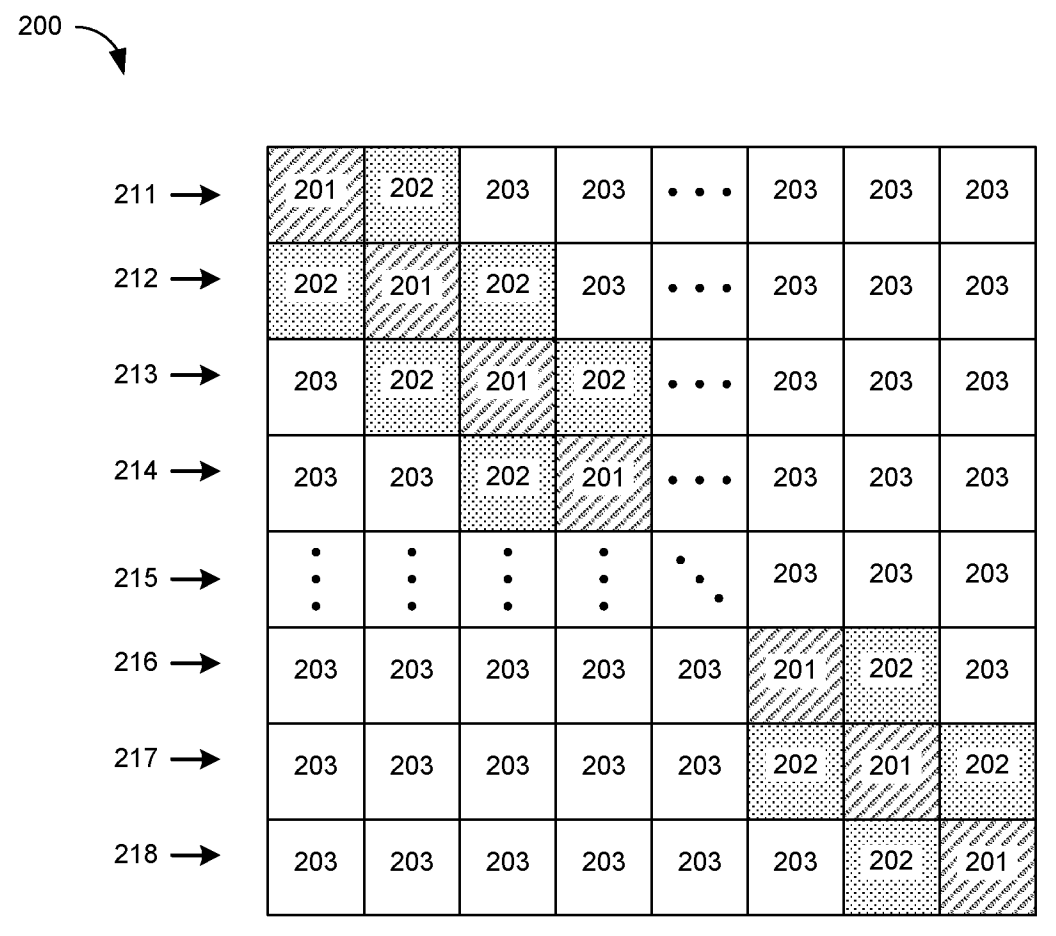

FIG. 2 illustrates a Hamiltonian matrix for a N-city traveling sales problem. Referring to FIG. 2, the $N^2 \times N^2$ matrix 200 has been divided into a plurality of submatrices, each of dimension N×N. As can be seen in FIG. 2, the matrix 200 features significant redundancy. In particular, the matrix 200 includes only three unique submatrices 201, 202, and 203.

Figure 3:
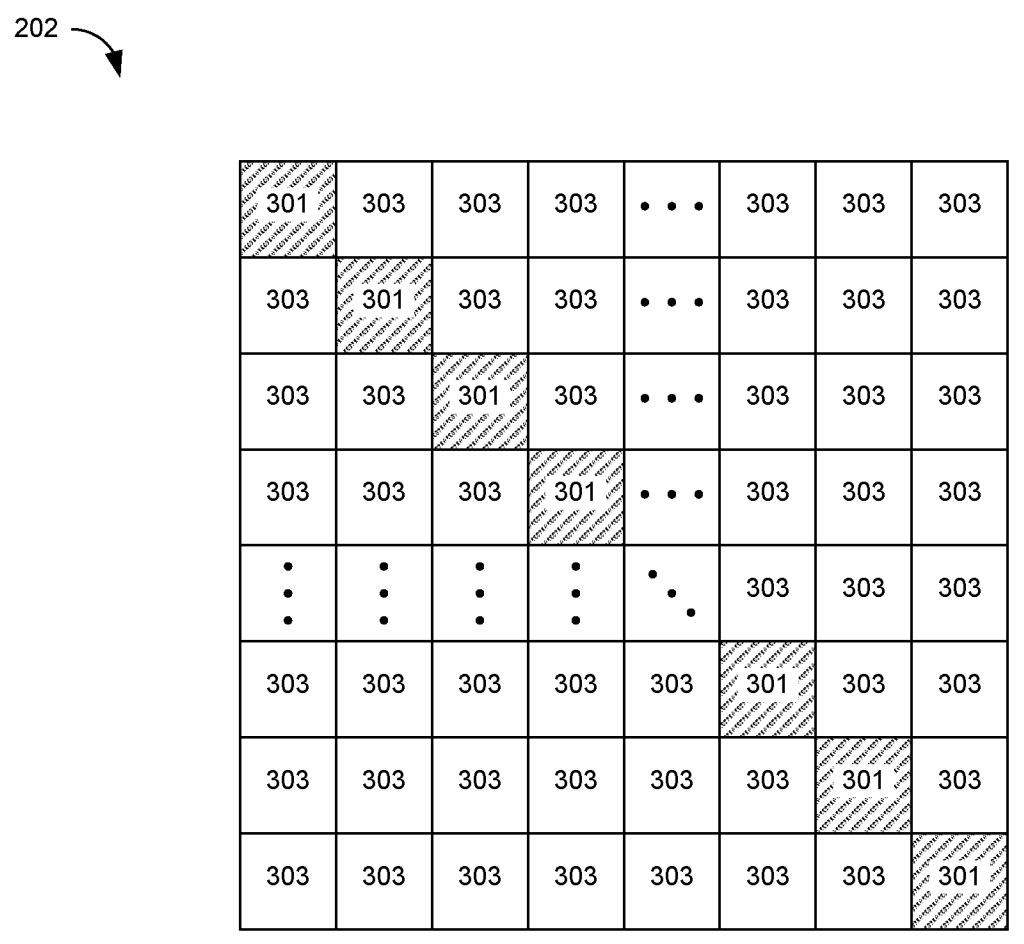
Figure 4:
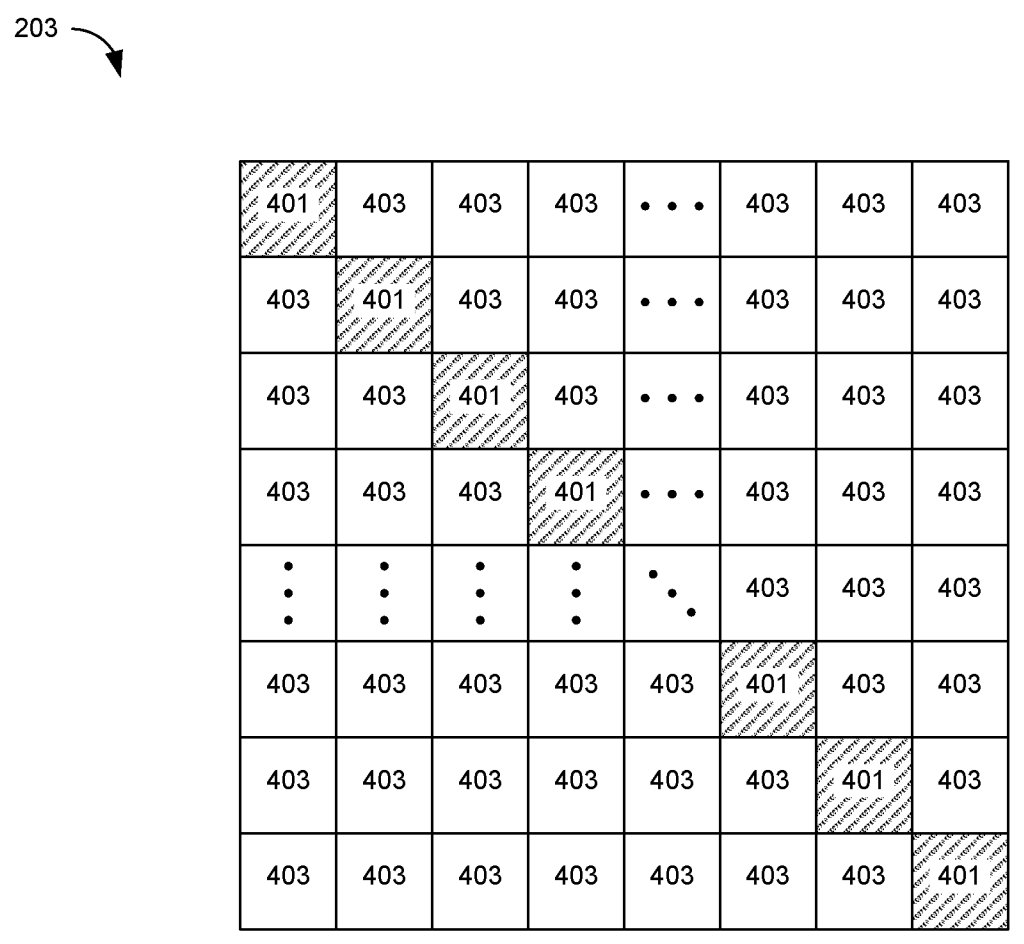
Figure 5:
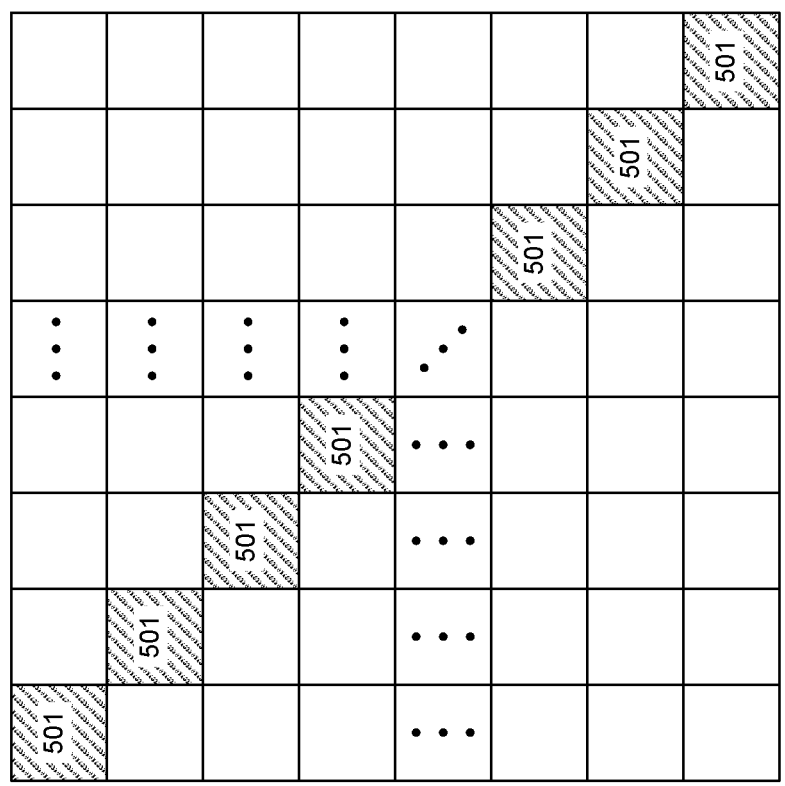
FIG. 5 illustrates still another unique submatrix of FIG. 2.

Significant redundancies exist within each submatrix as well. FIGS. 3-5 illustrate the submatrices of the matrix 200 FIG. 2. In FIGS. 3-5, each submatrix is of dimension N×N, with each element representing a value.

FIG. 3 illustrates the submatrix 202 of FIG. 2. As can be seen in FIG. 3, the submatrix 203 features significant redundancy. In particular, the submatrix 202 includes only two unique values 301 and 303. That is, the number of unique values in the submatrix 202 is two.

FIG. 4 illustrates the submatrix 203 of FIG. 2. As can be seen in FIG. 4, the submatrix 203 features significant redundancy. In particular, the submatrix 203 includes only two unique values 401 and 403. That is, the number of unique values in the submatrix 203 is two.

FIG. 5 illustrates the submatrix 201 of FIG. 2. As can be seen in FIG. 5, the submatrix 201 features some redundancy. In particular, the diagonal elements 501 all have the same value. However, the remaining elements may have other values, that may not feature significant redundancy. Accordingly, the number of unique values in the submatrix 201 of FIG. 2 may be given by $N(N-1)/2$.

Figure 6:
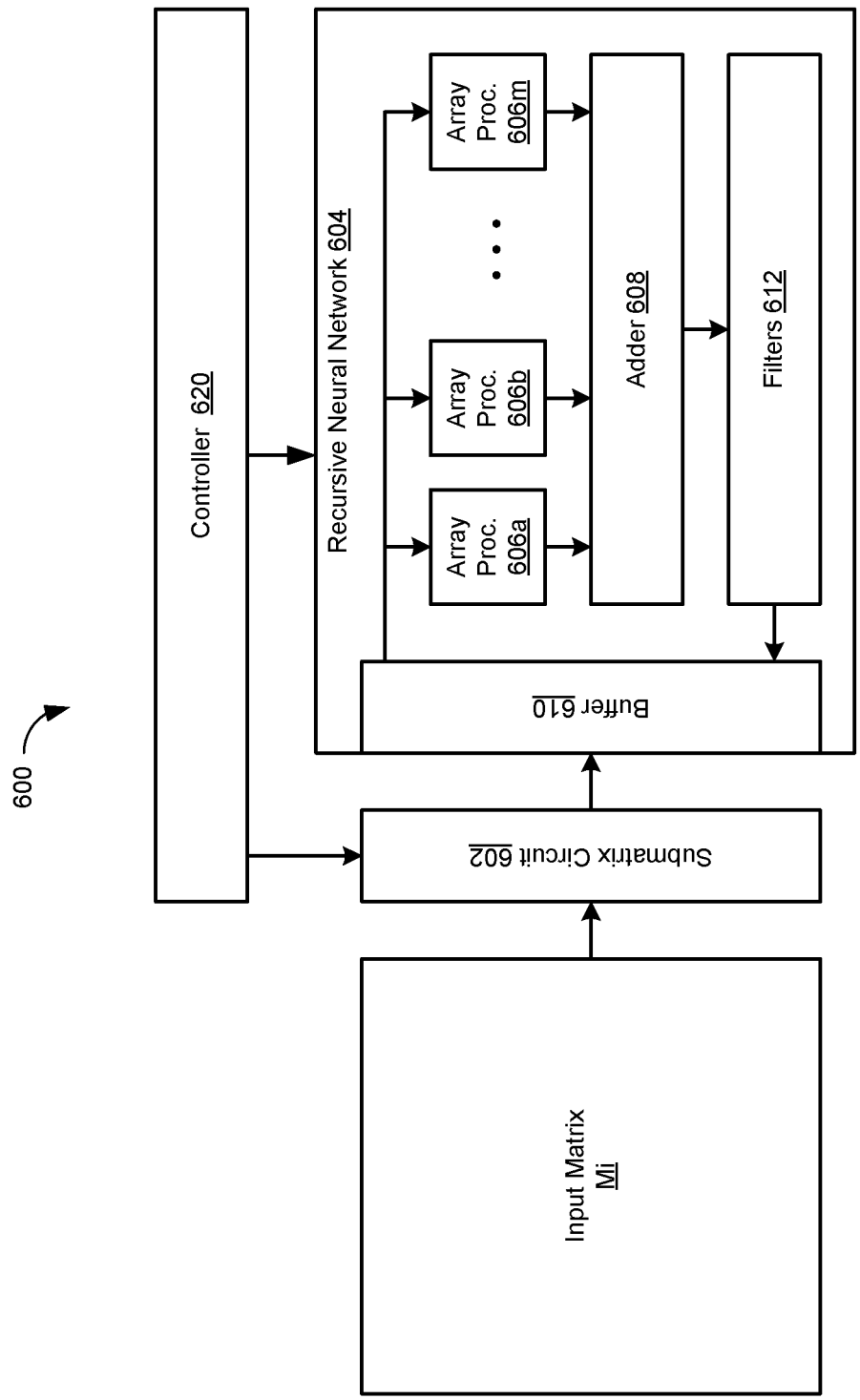
FIG. 6 depicts a hardware accelerator for processing a vector and the matrix according to some embodiments of the disclosed technology.

FIG. 6 depicts a hardware accelerator for processing a vector and the matrix according to some embodiments of the disclosed technology. Referring to FIG. 6, the hardware accelerator 600 may include a recursive neural network 604. Elements of the recursive neural network 604 may be implemented in hardware, software, or combinations thereof. The hardware accelerator 600 may include a controller 620. The controller 620 may be implemented as a processor, dedicated circuit, and the like, and combinations thereof. The controller 620 may control elements of the hardware accelerator 600 according to embodiments of the disclosed technology described herein.

The hardware accelerator 600 may include a submatrix circuit 602. The submatrix circuit 602 may be implemented as a processor, dedicated circuit, and the like, and combinations thereof. As described herein, the submatrix circuit 602 processes an input matrix MI to identify and select submatrices of the input matrix MI, and to provide those submatrices to the recursive neural network 604. As part of his processing, the submatrix circuit 602 may identify redundant submatrices in the input matrix MI. Redundant submatrices are those submatrices having identical arrangements of identical values.

The recursive neural network 604 may include a buffer 610. The buffer 610 may store the submatrices provided by the submatrix circuit 602. The buffer 610 may store one or more vectors to be processed with the submatrices. For example, the buffer 610 may store an input vector for processing with the input matrix MI.

The recursive neural network 604 may include one or more array processors 606. Each array processor 606 may be implemented as a crossbar array of memory elements. The memory elements may store values of the elements of one of the submatrices identified by the submatrix circuit 602. The memory elements may be implemented in any manner. In some embodiments, each memory element is implanted as a memristor. In various embodiments, each array processor 606 may be implemented as a Hopfield network, an optical Ising machine, a Mott computer, or the like.

In some embodiments, each of the array processors 606 may generate a dot product between an input vector stored in the buffer 610 and a submatrix stored in the elements of the array processor 606. In such embodiments, each array processor 606 has N row lines, N column lines, and $N^2$ memory cells each coupled between a respective combination of one of the row lines and one of the column lines. The column lines receive inputs according to the input vector stored in the buffer 610. Each row line delivers an output representing a dot product of the input vector and the values stored in the memory cells in that row line.

The recursive neural network 604 may include an adder 608. The adder 608 adds the outputs of the array processors 606 according to locations of the respective submatrices in the input matrix MI, as described in detail below.

The recursive neural network 604 may include one or more filters 612. The filters 612 may be linear or nonlinear, and may include simple filters such as thresholding filters, complex filters such as sigmoid filters, other filters, and combinations thereof. The filters 612 may filter the output of the adder 608 to generate a new input vector. The new input vector may be stored in the buffer 610. The recursive neural network 604, under the control of the controller 620, may operate in a recursive manner to apply each new input vector to the column lines of the array processors 606.

As described above, the submatrices may feature a high level of redundancy as well. Accordingly, the processes described above may be applied to process highly redundant submatrices in a similar manner.

Figure 7:
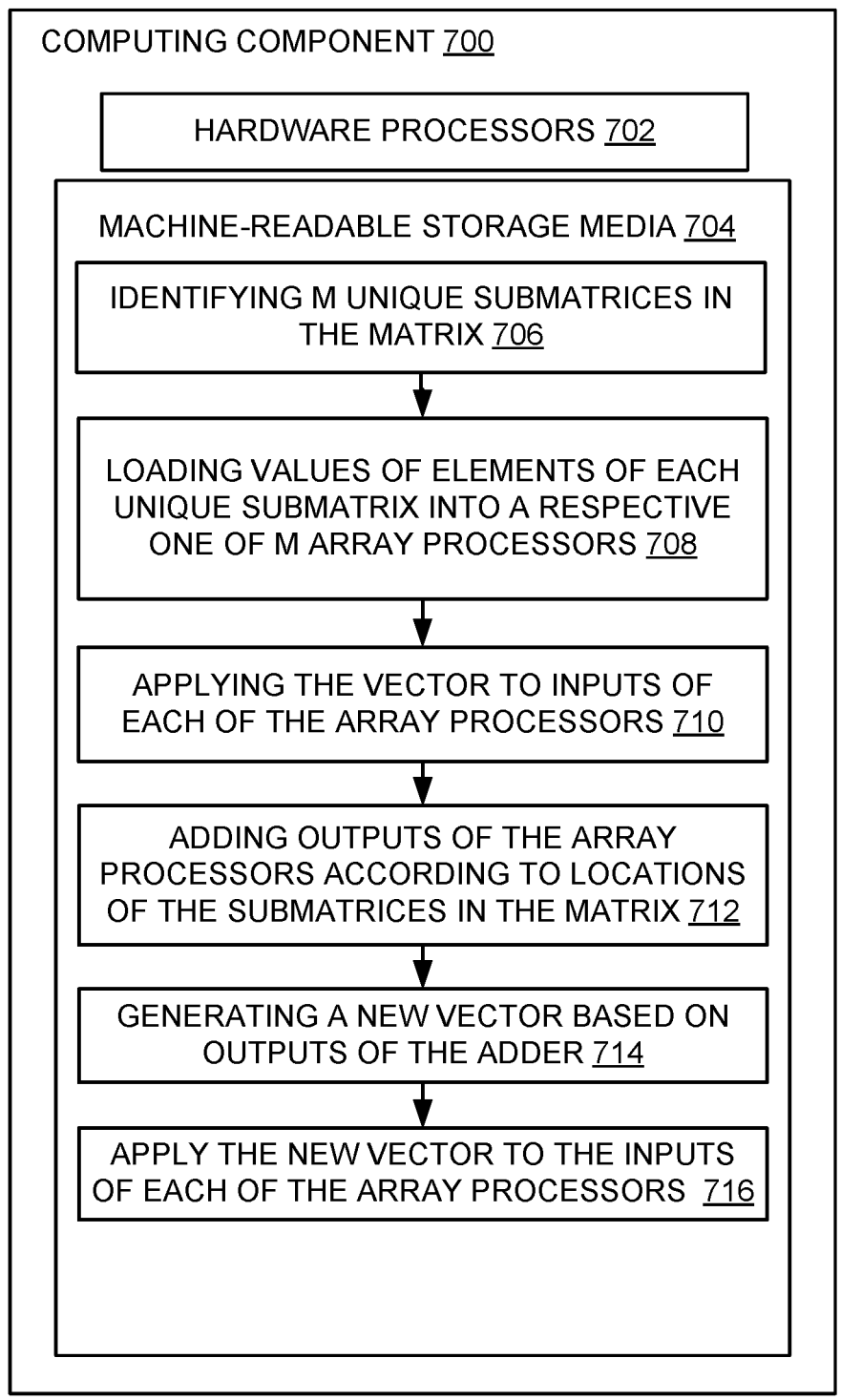
FIG. 7 is a block diagram of an example computing component or device for matrix tiling to accelerate computing in redundant matrices in accordance with one embodiment.

FIG. 7 is a block diagram of an example computing component or device 700 for matrix tiling to accelerate computing in redundant matrices in accordance with one embodiment. Computing component 700 may be, for example, a server computer, a controller, or any other similar computing component capable of processing data. In the example implementation of FIG. 7, the computing component 700 includes a hardware processor, 702, and machine-readable storage medium, 704. In some embodiments, computing component 700 may be an embodiment of one or more of the elements of the hardware accelerator 600 of FIG. 6.

Hardware processor 702 may be one or more central processing units (CPUs), semiconductor-based microprocessors, and/or other hardware devices suitable for retrieval and execution of instructions stored in machine-readable storage medium, 704. Hardware processor 702 may fetch, decode, and execute instructions, such as instructions 706-716, to control processes or operations for matrix tiling to accelerate computing in redundant matrices. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 702 may be a non-transitory storage medium, where the term "non-transitory" does not encompass transitory propagating signals. As described in detail below, machine-readable storage medium 702 may be encoded with executable instructions, for example, instructions 706-712.

Hardware processor 702 may execute instruction 706 to perform identifying M unique submatrices in the input matrix MI. This process may include identifying redundant submatrices. For example, to identify whether two submatrices are redundant, a difference between the two submatrices may be checked against a null matrix. In some embodiments, the dimensions of the input matrix MI may be $N^2 \times N^2$, and the dimensions of each submatrix may be N×N, where N is greater than 1 (N>1).

Hardware processor 702 may execute instructions 708 to perform loading values of elements of each unique submatrix into a respective one of the array processors 606. In the hardware accelerator 600 of FIG. 6, one row of submatrices may be processed at a time. For example, referring to FIG. 2, the row 211 of submatrices may be processed by the hardware accelerator 600. After processing one row of submatrices, the hardware accelerator 600 may process the next row of submatrices, and so on. In the example of FIG. 2, the hardware accelerator 600 may process rows 211, 212, 213, 214, 215, 216, 217, and 218, in that order. However, it is not necessary to process the rows in order. In other embodiments, the hardware accelerator 600 may process multiple rows of submatrices concurrently. In some embodiments the hardware accelerator may process all rows of submatrices concurrently.

In the example of FIG. 2, as described above, only three unique submatrices 201, 202, and 203 are present. Therefore, only three array processors 606 are needed in the hardware accelerator 600 of FIG. 6. In this example, each of the unique submatrices 201, 202, and 203 is loaded into a respective array processor 606.

Hardware processor 702 may execute instructions 710 to perform applying the vector to inputs of each of the array processors 606. In the example of FIG. 6, the buffer 610 stores the vector, and applies the vector to the column lines of each of the array processors 606, for example under the control of the controller 620.

Hardware processor 702 may execute instructions 712 to perform adding outputs of the array processors 606 according to locations of the submatrices in the matrix MI. With knowledge of the locations of the unique submatrices in the matrix MI, the adder 608 may add the outputs of the array processors 606 to generate a complete result for the row of submatrices. In the example of FIG. 2, multiple copies of submatrix 203 are present in row 211. Therefore the adder 608 may add the outputs of the array processor 606 for that submatrix 203 multiple times. Row 211 exhibits no redundancy for the submatrices 201 and 202. Therefore the adder 608 may add the outputs of the array processors 606 for those submatrices only one time.

Hardware processor 702 may execute instructions 714 to perform generating a new vector based on outputs of the adder 608. In the example of FIG. 6, the one or more filters 612 may filter the outputs of the adder 608 to generate the new vector, for example as described above. The new vector may be stored in the buffer 610.

Hardware processor 702 may execute instructions 716 to perform applying the new vector to the inputs of each of the array processors 606. In the example of FIG. 6, the buffer 610 may provide the new vector stored therein as inputs to the column lines of each of the array processors 606. In this manner, the recursive neural network 604 may operate in a recursive manner for a number of iterations to generate a solution for the current row of submatrices.

The process described above may be repeated for each row of submatrices. In some sparse and highly-redundant submatrices, it may be unnecessary to load the array processors 606 more than one time. For example, the matrix of FIG. 2 includes only three unique submatrices 201, 202, and 203. Therefore each row of submatrices may be processed using only these three submatrices. The submatrices 201, 202, and 203 may be loaded into the array processors 606 only once. Then, any row of submatrices may be processed by providing the number of occurrences of each of those submatrices in the row to the adder 608.

Figure 8:
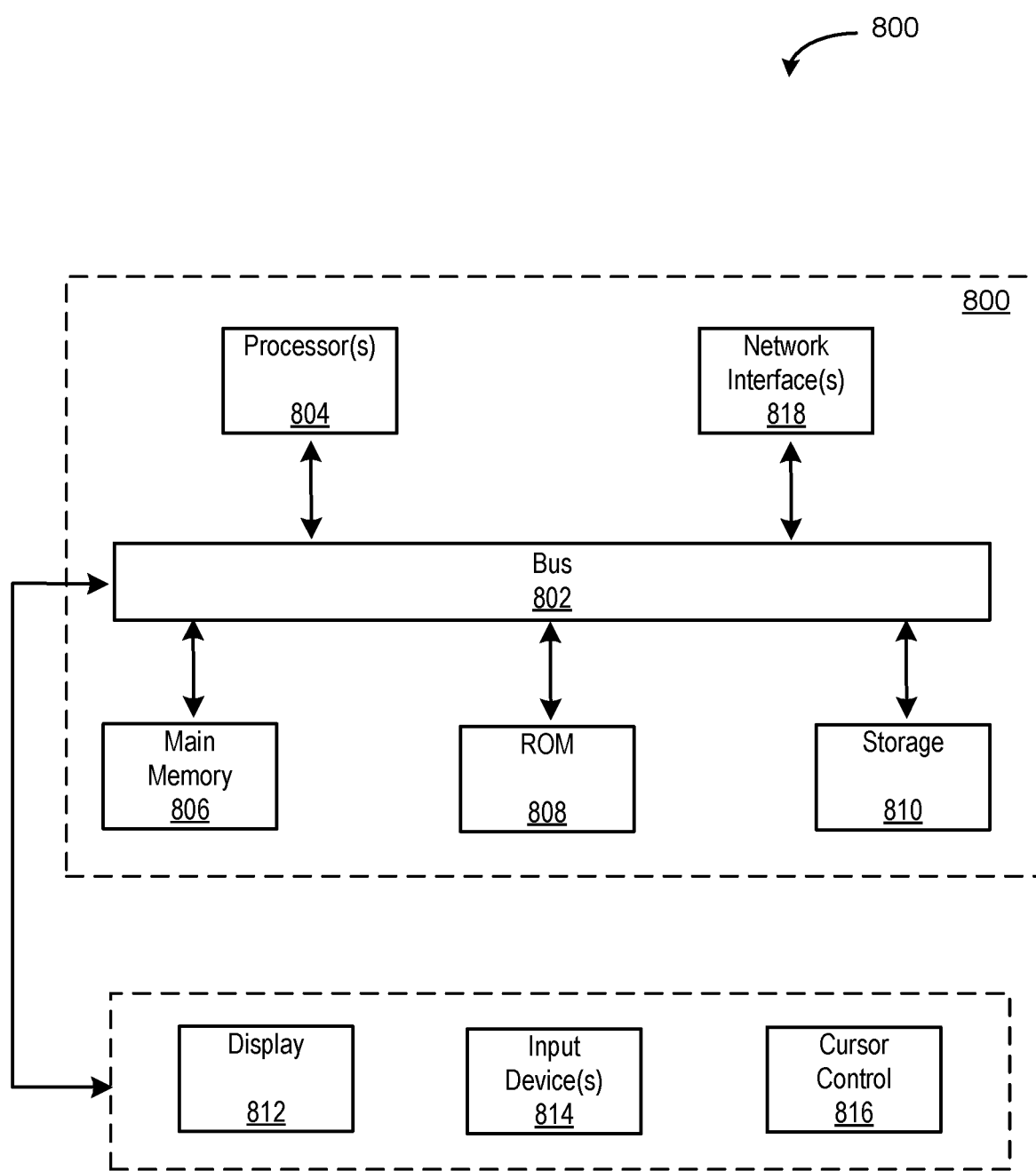
FIG. 8 depicts a block diagram of an example computer system in which various of the embodiments described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:
1. A hardware accelerator for processing a vector and a matrix, the apparatus comprising:
   a plurality of array processors;
   a submatrix circuit configured to identify unique submatrices in the matrix, and to load the values of elements of each unique submatrix into a respective one of the array processors;
   a buffer configured to apply the vector to inputs of each of the array processors; and
   an adder configured to add outputs of the array processors according to locations of the unique submatrices in the matrix.

2. The hardware accelerator of claim 1, wherein each array processor comprises N row lines, N column lines, and N2 memory cells each coupled between a respective combination of one of the row lines and one of the column lines, wherein, in each of the array processors:
the memory cells are configured to store values of elements of the matrix;
the column lines are configured to receive inputs according to the vector; and
each row line is configured to deliver an output representing a dot-product of the input vector and the values stored in the memory cells of the row line.

3. The hardware accelerator of claim 1, wherein each array processor comprises at least one of:
a Hopfield network;
an optical Ising machine; and
a Mott computer.

4. The hardware accelerator of claim 1, wherein each of the memory cells includes:
a memristor.

5. The hardware accelerator of claim 1, further comprising:
at least one filter configured to generate a new vector based on outputs of the adder;
wherein the buffer is further configured to apply the new vector to the inputs of each of the array processors.

6. The hardware accelerator of claim 5, further comprising:
a controller configured to operate the array processors, the adder, the filter, and the buffer in a recursive operation.

7. The hardware accelerator of claim 1, wherein:
the vector has dimensions of N×1 elements, wherein N>1;
the matrix has dimensions of N2×N2 elements; and
each of the submatrices has dimensions of N×N elements.

8. A hardware accelerator for processing a vector and a matrix, the apparatus comprising:
a plurality of means for processing an array;
means for identifying unique submatrices in the matrix;
means for loading the values of elements of each unique submatrix into a respective one of the array processors;
means for applying the vector to inputs of each of the array processors; and
means for adding outputs of the means for processing an array according to locations of the unique submatrices in the matrix.

9. The hardware accelerator of claim 8, wherein each means for processing an array comprises N row lines, N column lines, and N2 memory cells each coupled between a respective combination of one of the row lines and one of the column lines, wherein, in each of the array processors:
the memory cells are configured to store values of elements of the matrix;
the column lines are configured to receive inputs according to the vector; and
each row line is configured to deliver an output representing a dot-product of the input vector and the values stored in the memory cells of the row line.

10. The hardware accelerator of claim 9, wherein each means for processing an array comprises at least one of:
a Hopfield network;
an optical Ising machine; and
a Mott computer.

11. The hardware accelerator of claim 9, wherein each of the memory cells includes:
a memristor.

12. The hardware accelerator of claim 9, further comprising:
means for generating a new vector based on outputs of the adder;
wherein the means for applying applies the new vector to the inputs of each of the means for processing an array.

13. The hardware accelerator of claim 12, further comprising:
means for operating the means for processing, the means for adding, the means for generating, and the means for applying in a recursive operation.

14. The hardware accelerator of claim 9, wherein:
the vector has dimensions of N×1 elements, wherein N>1;
the matrix has dimensions of N2×N2 elements; and
each of the submatrices has dimensions of N×N elements.

15. A method for processing a vector and a matrix, the method comprising:
identifying unique submatrices in the matrix;
loading values of elements of each unique submatrix into a respective one of the array processors;
applying the vector to inputs of each of the array processors; and
adding outputs of the array processors according to locations of the unique submatrices in the matrix.

16. The method of claim 15, wherein each processing an array comprises N row lines, N column lines, and N2 memory cells each coupled between a respective combination of one of the row lines and one of the column lines, wherein, in each of the array processors:
the memory cells are configured to store values of elements of the matrix;
the column lines are configured to receive inputs according to the vector; and
each row line is configured to deliver an output representing a dot-product of the input vector and the values stored in the memory cells of the row line.

17. The method of claim 15, wherein each processing an array comprises at least one of:
a Hopfield network;
an optical Ising machine; and
a Mott computer.

18. The method of claim 15, further comprising:
generating a new vector based on outputs of the adder;
wherein the applying applies the new vector to the inputs of each of the array processors.

19. The method of claim 18, further comprising:
operating the processing, the adding, the generating, and the applying in a recursive operation.

20. The method of claim 15, wherein:
the vector has dimensions of N×1 elements, wherein N>1;
the matrix has dimensions of N2×N2 elements; and
each of the submatrices has dimensions of N×N elements.

* * * * *